June 28, 1966 C. H. SCOTT 3,258,384
APPARATUS FOR FORMING TUBULAR PLASTIC MEMBERS
Filed Feb. 14, 1963 2 Sheets-Sheet 1
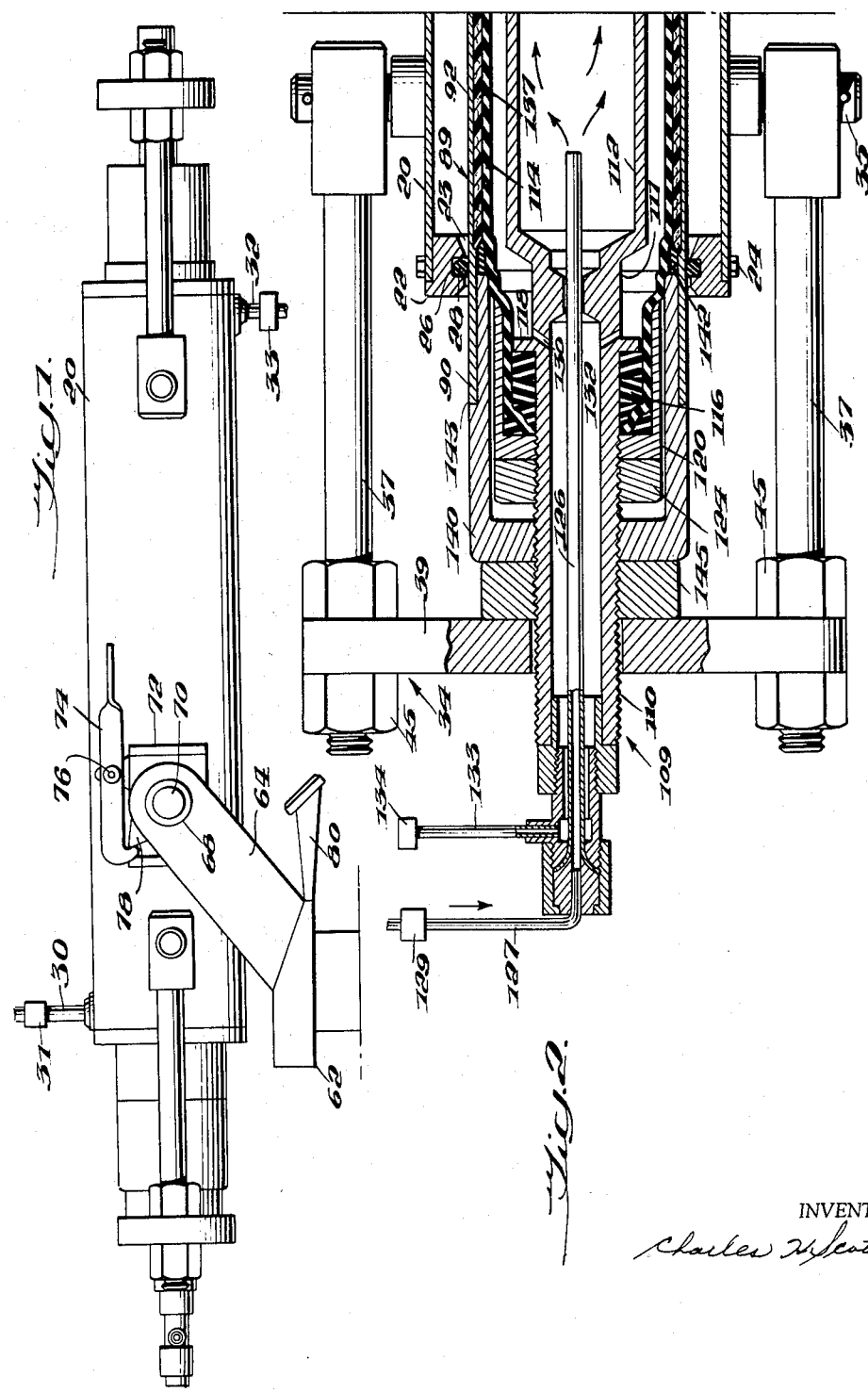
INVENTOR
Charles H. Scott

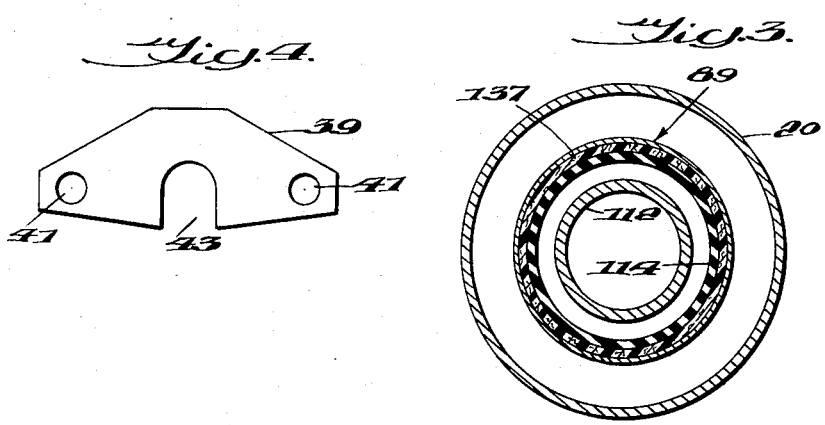

United States Patent Office 3,258,384
Patented June 28, 1966

1

3,258,384
APPARATUS FOR FORMING TUBULAR PLASTIC MEMBERS
Charles H. Scott, Braintree, Mass., assignor to Babbitt Pipe Company, Inc., West Hanover, Mass.
Filed Feb. 14, 1963, Ser. No. 258,588
10 Claims. (Cl. 156—423)

The present application is a continuation-in-part of application Serial No. 138,185, filed September 14, 1961, by the instant inventor.

The invention disclosed herein relates to the fabrication of tubular members of fibrous material and thermo-setting resins, and more particularly to the apparatus for their fabrication either as a lining or covering for a metal tubular member or as a tubular member usable as a pipe conduit or other similar product.

Numerous means have been used for the making of tubular plastic members. Herein the invention is directed to the type wherein a fibrous material is impregnated with a thermo-setting resin advanced to the B-stage and thereafter either spirally or convolutely wound into a preform by any of the methods well known in the art. Heretofore, the preform has usually been placed within a rigid mold and subjected to heat and radial pressure, the pressure being either exerted radially outward compressing the preform outwardly against the mold or radially inward compressing it against a rigid mandrel.

In accordance with the invention disclosed herein opposed radial pressures are employed which permit the utilization of relatively thin metal tubes within which the preform is fabricated to its finished state although the pressures employed are of such degree that creeping or other damage to the metal would result unless compensated for by the utilization of an opposed pressure.

The foregoing is accomplished by utilizing an apparatus wherein the metal tubular member in which the preform is fabricated constitutes the inner wall or shell of a double wall tubular mold, the spacing therebetween defining a pressure chamber.

An advantage of the invention disclosed herein is that the same apparatus may be used for fabricating tubular members having different outside diameters inasmuch as the inner wall is a removable member. When metal tubes are being lined or covered, that is, the plastic tubular member is being formed integrally therewith, metal tubes which, having a bow or ovality which would prevent their fitting within a mold having true internal dimensions, can be processed and the bow and ovality, will, for all practical purposes, be eliminated.

The foregoing and other advantages and uses will become apparent from the description of the invention when read in view of the drawings; wherein FIGURE 1 is a side view of the apparatus disclosed herein;

FIGURES 2 and 2a show a horizontal sectional view of FIGURE 1, with the device under pressure during a curing operation;

FIGURE 3 is a vertical sectional view showing the position of the parts during a curing operation; and FIGURE 4 is a view of the yoke for the forward thrust assembly.

Referring to the drawings the mold comprises an outer tubular shell or casing 20 of any suitable rigid metal

2 having a wall thickness sufficient to withstand the maximum pressure to be established within the device. Mounted in each end of shell 20 are closure members 22, secured in position by stud bolts 24, any suitable sealer being used therebetween to make a pressure and leak proof joint.

Each closure member 22 is of ring form having a central opening 23 and the inner circumferential face of each of the members 22 at opening 23 is provided with a U-channel 26 to receive an O-ring 28 to provide a seal, the closures providing supports for concentrically positioning an inner casing as hereinafter described.

The outer shell 20 has a top fluid inlet 30 (FIGURE 1) at one end thereof which is provided with a suitable control valve 31, and at its opposite end with a bottom fluid outlet 32 provided with a two-way control valve 33 for draining or connecting it to a vacuum producing source.

The shell 20 has pivotally mounted thereon front and rear thrust means 34 and 36. The front thrust means 34 include diametrically opposed trunions 35 welded to shell 20, and pivotally mounted on each trunion is a yoke supporting arm 37 having a threaded outer end. Carried by the arms 37 is a yoke 39 (FIGURE 4) having spaced openings 41 through which arms 37 extend and a central U opening 43 for straddling the extending end of a mandrel 109 hereinafter described. The yoke 39 is positioned and secured on arms 37 by opposed holding nuts 45.

The rear thrust means 36 also includes the trunion 35 on which are pivotally mounted the arms 37 threaded at their outer ends and supporting a thrust screw carrier plate 44 having spaced openings through which arms 37 extend and on which they are positioned by nuts 42. The screw carrier 44 has a central threaded opening 46 for receiving a threaded thrust screw 48. The inner end of thrust screw 48 has a reduced end 50 threadedly projecting through a central opening in the base of a cup-shaped end support 60, the forward circumferential face or rim of the cup 60 engaging the end of an inner mold casing as subsequently shown.

The outer casing 20 is pivotally mounted on a support having a base 62 (FIGURE 1) provided with an arm 64 extending upwardly and rearwardly therefrom, and having an opening 68 at its upper end for receiving a pivot 70. Pivot 70 is integral with and laterally extends from a pivot block 72 welded to the casing 20. Pivotally mounted at 76 on the upper edge of block 72 is a latch 74 which engages a keeper 78 on the arm 64, for holding the casing in a horizontal position.

The casing pivot 70 is positioned forward of the center of gravity of shell 20 and when latch 74 is released the casing will pivot into engagement with stop 80 extending rearwardly from base 62, whereupon the casing will assume an angular incline of approximately 50° for reasons hereinafter explained.

As best seen in FIGURES 2 and 2a, the inner casing of the mold is a flexible or non-rigid metal tubular member 89, herein being a rocket casing having a relatively heavy forward throat portion 90, a light elongated body portion 92, an end portion 94, having a central opening 95. The throat portion and bottom portion have a substantially heavier wall thickness than the body portion, and a tubular collar portion 98 extending beyond the end closure.

The end portion central opening is closed by a stop 99 mounted on the end of a threaded volt 102 which projects rearwardly through the opening to receive nut 106 for holding the stop in position. Projecting inwardly from stop 99 and integral therewith is a mushroom seal holder 104 carrying a flash seal 105 of Teflon or other suitable material which is co-extensive with and overlies the casing end portion 94. The inner casing 89 is of such length that it spans or exceeds the length of the outer casing and of such diameter that it is engaged by the O rings mounted in the end closures. The inner and outer casings thus define a pressure chamber therebetween. In defining the inner casing as flexible and non-rigid the terms are used to indicate a thin walled tube wherein the metal may be slightly flexed without damaging it.

Positioned within the inner casing is a mandrel 109 having a threaded neck portion 110, a throat portion 111 and a hollow core portion 112, all integrally connected. The contour of the core is similar to an elongated flask or bag having a cylindrical wall portion and end or bottom portion. Overlying the entire core and closely fitting same, when not in the expanded position shown, is a diaphragm 114 of expansible material such as rubber. The diaphragm has the same shape as core 112 in order to overlie and enclose it, with the open end extending beyond a radially circumferential flange 118 on the inner end of the neck portion 110, where the diaphragm is secured by the gasket sealing means 116, sealing cup 120 and nut 124.

The neck portion 110 of the mandrel is hollow and extending centrally therethrough is an inlet passage or tube 126 which continues through and closes the throat 111 and projects into the hollow core 112. The outer end of passage 126 connects to a hydraulic fluid line 127 which connects through valve 129 to a suitable source of heated hydraulic fluid under pressure. As indicated by the arrows when fluid under pressure is admitted, it will flow into the mandrel core then through openings 128 in the end thereof against the diaphragm whereupon the flow of the fluid is reversed and it flows forwardly and out through openings 130 in the throat 111 into the hollow neck passage 132 of the neck 110. The passage 132 connects to an outlet line 133 controlled by two way valve 134 which may direct the fluid back to its source or connect it to a vacuum pump (not shown). Obviously by proper control of the outlet valve 134, the pressure within the mandrel may be controlled.

The plastic tubular member or preform 137 is asbestos sheet material which has been treated with thermo setting resin and cured to the "B" stage. In this instance phenolic resin is being used and the material has been either convolutely or spirally wound into a preform onto a steel mandrel with a sufficient number of plies to assure proper wall thickness of the finished member, which herein will become a lining for the rocket tube.

As the inner mold casing in this embodiment has a throat portion 90 of lesser inside diameter than its body portion 92, the preform must have an outside diameter slightly smaller than the throat diameter.

With the preform 137 placed within the mold, an air mandrel is placed within the preform. The air mandrel is of similar construction to mandrel 109, but is connected to a source of air instead of fluid. Air is then injected to expand the mandrel diaphragm until the preform fits tightly against the wall of casing 89, whereupon the air is released and the mandrel is removed.

Following the withdrawal of air mandrel a Teflon spacer ring 142 is placed in position at the forward end of the lining and the mandrel 109 is thereafter inserted. A cup shaped spacer member 140 is then positioned with its inner end or rim abutting Teflon ring 142. The forward end of member 140 has a reduced outside end diameter to fit inside the inner casing 89 with shoulder 143 abutting the end of the throat portion 90. A nut 145 screw threadedly mounted on the mandrel neck 110 may then be taken up to position the member 140 in place.

Thereafter the front and rear thrust members are pivoted into position and are secured as shown with the yoke 39 at the forward end abutting nut 145 and cup member 60 at the rear end abutting the end portion 94 of the rocket tube. Obviously if the inner casing is open at its rear end, the cup member 60 would be similar to the forward cup member 140 to engage the end of the casing 89. With the thrust members in position the inner casing is fixed relative to the outer and thus the mold has an outer rigid wall and an inner flexible wall. The thrust means further serve to hold the mandrel in proper position. With the type of mandrel used a sudden surge of pressure acting against the bottom (right end) could cause the mandrel to become dislodged were it not secured. It thus becomes apparent that the thrust means position and hold the outer casing, inner casing and mandrel in positive position throughout the molding operation.

The fluid control valve 129 is now opened and hydraulic fluid, heated to a temperature below the curing temperature of the resin, is admitted to the mandrel, the outlet valve 134 being kept open until all air has been eliminated from the mandrel. Valve 134 is then partially closed to cause pressure to build within the mandrel and expand the diaphragm. The temperature of the fluid is kept below the curing temperature of the resin until the resin has softened and the entire preform becomes extremely pliable.

In order to obtain the desired adhesion it has been found that high pressures are desirable, that is, pressures approximating 1000 p.s.i. However, although the inner casing is flexible, it has in this instance a wall thickness of .019 of an inch, the high pressure used would cause the metal to creep and surges of pressure could rupture the tube.

To prevent the foregoing an opposed pressure is established between the inner and outer mold casings 20 and 89. Because of this as outlet valve 134 is gradually closed to build up the internal outwardly acting pressure in the diaphragm, inlet valve 31 on casing 20 is opened and outlet valve 33 closed to build up an external inwardly acting pressure in the mold.

The pressure in the mold that is acting externally on the casing may be relatively low in that it need only be sufficient to prevent the inner shell from creeping or otherwise be damaged. Assuming that the pressure at which the metal would yield or creep is 900 p.s.i, an external pressure of 125 p.s.i. is established so that the internal pressure is acting outwardly against 1025 lbs. pressure, which prevents creeping and acts as a safety factor against sudden pressure surges. In effect the inner casing 89 is reinforced by surrounding it with a pressure restraining means.

With the pressures established, the temperatures of the fluids are raised to the curing temperature of the resin and held for the required curing time of approximately two minutes per ply. During the curing period the device is set at an angle by releasing latch 74 permitting gas to rise and escape from the upper end.

Upon the completion of the curing cycle temperatures are reduced to 100° whereupon the pressures are released and the inlet valves closed. To assure emptying of the mandrel and withdrawal of the diaphragm from the tubular lining, valve 134 can be set to connect outlet passage 132 to a vacuum source assuring withdrawal of all fluid. The thrust means are then released, the mandrel is withdrawn from the rocket tube, whereupon the latter is withdrawn.

As determined from the foregoing description, heat and pressure are simultaneously applied both internally and externally. By the application of external pressure it is possible to line metal tubings which would otherwise creep or burst under high internal pressures. By simultaneous application of heat, in both chambers, rapid transfer is accomplished resulting in excellent adhesion of the lining to the metal.

Another result accomplished by the simultaneous application of external and internal heat and pressure is that the casing returns to almost true cylindrical shape and axial alignment. As previously stated the metal casings often have a wall thickness as low as .019 and during initial heat treatment, in the making of the metal tubes, they become oval and assume a bow, that is, loose true axial alignment. The distortion is such that the tubes will not fit into molds having a fixed inside diameter. When subject to the high pressure herein, where the tube is the mold, and so held throughout the curing cycle, the ovality and bow are for all practical purposes brought within acceptable limits.

Although the inner casing has here been shown as a rocket tube and the process of lining the tube described, the removability of the inner casing is indicative of the versatility of the apparatus as the apparatus may be utilized for many different sizes of tubing.

Herein the outer casing must withstand the highest external pressure required and for purposes of explanation may be said to have a four inch inside diameter whereas the external diameter of casing illustrated is 2.5 inches. By changing end closures 22 the inner casing may be of varying sizes with an upper limit of outside diameter only sufficiently less than four inches to provide space for the outer pressure chamber. Because of this, various sizes of tubing can be made by interchanging the end closures to accept inner casings of different outside diameters.

Moreover as the inner casing is pressure supported, relatively light casings may be used, permitting the use of an aluminum mold which will not require a special internal finish.

This interchangeability is highly desirable from a production view-point. At present a specific mold is required for each size of pipe. With this apparatus a single mold with interchangeable end closures and inner casings may be used for numerous sizes, thus reducing the number of installations required together with all the auxiliary equipment necessary for each installation.

Summarizing it becomes evident that the utilization of compensating forces or degrees of pressures result in the utilization of the apparatus described for the fabrication of various types of tubular members. When pressure of such a decree that damage to the casing may result, it is readily compensated for by the opposed pressure and circumferential or longitudinal rupturing by sudden surges is prevented.

It is apparent that if it is desired to cover the inner casing, a preform may be formed directly thereon or it may be inserted in a preform. Because of the increased diameter the enclosures 26 may be slipped over the casing ends and then secured in position. The process pressures would be reversed with the mandrel acting as a compensating pressure. Obviously lining and covering can be accomplished simultaneously.

What is claimed is:

1. In an apparatus for molding plastic tubular members of the type comprising a tubular mold and an expansible mandrel insertable into the mold, the improvement wherein the mold has a rigid non-rotatable outer tubular casing having a fluid inlet, an inner tubular flexible casing, closure members for the ends of the outer casing member, said closure members having central openings therein in which the inner casing member is supported whereby a pressure chamber is defined between said casings, the mandrel being positioned within and normally spaced from the inner surface of said inner casing.

2. The apparatus defined in claim 1 wherein said closure members are removably mounted on said outer casing.

3. The apparatus defined in claim 1 including holding means mounted on said outer casing for releasably engaging the ends of the inner casing for positioning it relative to the outer casing.

4. The apparatus defined in claim 3 wherein said holding means comprises a pair of oppositely disposed pivots secured to said outer casing, an arm pivotally mounted at one end on each of said pivots, a yoke carried on the free ends of said arms, and abutting holding means intermediate of the yoke and the end of the inner casing.

5. In an apparatus for molding plastic tubular members of the type comprising a substantially stationary tubular mold and a pressure expansible mandrel insertable in the mold, the improvement comprising thrust means pivotally mounted on each end of the mold, and means interconnecting the thrust means with the mandrel to position it within the mold and restrain it in position when under pressure.

6. An apparatus for molding a tubular member comprising a rigid essentially stationary outer casing, means for maintaining said outer casing essentially stationary during molding operations, end closures for said outer casing each having a central opening therein, a relatively flexible inner casing supported in said openings and spaced from said outer casing to define a pressure chamber, means for introducing a pressure fluid into said pressure chamber, a mandrel positioned within said inner casing and having an expansible diaphragm adapted to cooperate with said inner casing during molding operations, a first thrust means supported on said outer casing adjacent one end thereof and operatively connected to said mandrel, and a second thrust means mounted on said outer casing adjacent the other end thereof and operatively connected to one end of said inner casing.

7. An apparatus for molding tubular members comprising an essentially non-rotatable outer casing, means for maintaining said outer casing relatively stationary during molding operations, end closures for said outer casing having central openings therein, a relatively flexible inner casing supported in said openings and spaced from said outer casing to form a pressure chamber, means for introducing a pressure fluid into said pressure chamber, a mandrel positioned within said inner casing and having an expansible diaphragm, and means to position said mandrel within said inner casing and restrain it in position when under pressure, said last mentioned means including thrust means pivotally mounted on said outer casing, a yoke provided with a central aperture therein, a pair of yoke supported arms connected at one end to said yoke and pivotally connected at the other end to said outer casing, and means interconnecting said yoke and said mandrel.

8. Apparatus according to claim 7, further comprising conduit means extending through the aperture provided in said yoke to supply a pressure fluid to said mandrel.

9. Apparatus for molding plastic tubular members comprising a substantially stationary rigid outer casing, end closures for said outer casing, an inner flexible casing positioned within said outer casing and spaced therefrom to form a pressure chamber, means for introducing a pressure fluid into said pressure chamber, means for withdrawing a pressure fluid from said pressure chamber, a mandrel positioned within and spaced from said inner casing, said mandrel including a tubular hollow neck portion and a tubular core portion connected to said neck portion and of larger diameter than said neck portion, an expansible diaphragm having an open end and a closed end completely surrounding said core portion, means securing the open end of said diaphragm to said neck portion, fluid inlet means extending through said neck portion into said core portion to introduce a pressure fluid for expanding said diaphragm, said core portion being provided with at least one opening spaced from said inlet means and leading through said core portion to beneath said diaphragm, and said neck portion being provided with at least one exit passage extending from beneath said diaphragm to within said neck portion.

10. Apparatus for molding tubular members comprising a relatively stationary, rigid outer casing of a size capable of withstanding the maximum pressure to be utilized, a relatively flexible tubular inner casing spaced from said outer casing and defining a pressure chamber therebetween, means sealing off the spacing between the casings adjacent each end thereof, a mandrel spaced within said inner casing and having an expansible diaphragm, said diaphragm in an unexpanded condition being spaced from said inner casing to provide a mold cavity for receiving a tubular preform, conduit means extending into said mandrel to supply a high pressure fluid to expand said diaphragm whereby said diaphragm expands into contact with a preform inserted in the mold cavity and the pressure of said high pressure fluid is thereby transmitted to the relatively flexible inner casing, means regulating the pressure of said pressure fluid to enable attainment of a value which could damage said inner casing, and means for supplying fluid pressure into said pressure chamber between said casings to protect said inner casing from damage due to the high pressure within said diaphragm.

References Cited by the Examiner

UNITED STATES PATENTS

| | | | |
|---|---|---|---|
| 948,335 | 2/1910 | Martens | 18—43 XR |
| 2,343,005 | 2/1944 | Gardner | 18—45 |
| 2,517,974 | 8/1950 | Chase. | |
| 2,612,673 | 10/1952 | Billner | 25—28 |
| 2,730,783 | 1/1956 | Kennison | 25—128 XR |
| 2,826,784 | 3/1958 | Pratt | 18—19 |
| 2,832,096 | 4/1958 | Kramer et al. | 18—45 |
| 2,999,272 | 9/1961 | Warnken | 18—19 |
| 2,999,780 | 9/1961 | Perrault | 25—30 XR |
| 3,015,855 | 1/1962 | Merkel | 264—314 XR |
| 3,099,061 | 7/1963 | Marchioli. | |

J. SPENCER OVERHOLSER, *Primary Examiner.*

WILLIAM J. STEPHENSON, J. H. FLINT, *Examiners.*